(12) United States Patent
Bamber

(10) Patent No.: US 7,825,758 B2
(45) Date of Patent: Nov. 2, 2010

(54) SOLENOID ASSEMBLY

(75) Inventor: Daniel Bamber, St. Clair Shores, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 12/627,127

(22) Filed: Nov. 30, 2009

(65) Prior Publication Data

US 2010/0073116 A1 Mar. 25, 2010

Related U.S. Application Data

(63) Continuation of application No. 11/739,179, filed on Apr. 24, 2007, now abandoned.

(51) Int. Cl.
H01F 7/08 (2006.01)
H01F 7/12 (2006.01)
H01F 3/00 (2006.01)

(52) U.S. Cl. .................. 335/220; 335/249; 335/251; 335/253; 335/255; 335/261; 335/262; 335/279

(58) Field of Classification Search .................. 335/55, 335/80, 95, 119, 124, 125, 131, 144, 154, 335/180, 203, 204, 220, 233, 249, 251, 253, 335/255, 258, 261–265, 269–270, 273–275, 335/279
See application file for complete search history.

(56) References Cited

U.S. PATENT DOCUMENTS

| | | | |
|---|---|---|---|
| 3,070,730 A | 12/1962 | Gray et al. | |
| 4,093,931 A | 6/1978 | Fenton | |
| 4,438,419 A | 3/1984 | Helinski | |
| 4,490,701 A | * | 12/1984 | Dietrich et al. ............... 335/78 |
| 4,632,155 A | * | 12/1986 | Maina ........................ 139/452 |
| RE32,860 E | 2/1989 | Clark | |
| 5,300,908 A | * | 4/1994 | Stone et al. ................. 335/256 |
| 5,547,165 A | * | 8/1996 | Brehm et al. .......... 251/129.16 |
| 5,586,747 A | 12/1996 | Bennardo et al. | |
| 5,752,308 A | 5/1998 | Maley et al. | |
| 5,883,557 A | * | 3/1999 | Pawlak et al. ............... 335/179 |
| 6,078,235 A | 6/2000 | Schebitz et al. | |
| 6,144,275 A | 11/2000 | Hirata et al. | |
| 6,386,220 B1 | 5/2002 | Koenings | |
| 6,615,780 B1 | 9/2003 | Lin et al. | |

(Continued)

FOREIGN PATENT DOCUMENTS

WO  WO98/26168  6/1998

OTHER PUBLICATIONS

International Search Report and Written Opinion of the ISA for Counterpart Application No. PCT/US2008/061256, mailed Aug. 6, 2008.

*Primary Examiner*—Anh T Mai
*Assistant Examiner*—Mohamad A Musleh
(74) *Attorney, Agent, or Firm*—Dykema Gossett PLLC

(57) ABSTRACT

A solenoid assembly for use in connection with a housing and valve body is provided. The assembly includes a magnetic coil, a magnetic pole piece, an operating rod, a magnetic armature, and at least two bearings positioned between a portion of the magnetic pole piece and a portion of the operating rod. The operating rod is slidably disposed along the bearings. The magnetic armature is at least in part centered relative to the pole piece. Activation of the coil provides an attraction between the armature and the pole piece.

20 Claims, 3 Drawing Sheets

U.S. PATENT DOCUMENTS 6,715,732 B2    4/2004  Kumar
6,768,406 B1    7/2004  Fiaccabrino
6,778,049 B1 *  8/2004  Alyanak .................... 335/255
2002/0053965 A1 * 5/2002  Comtois et al. ............. 335/251
2005/0115618 A1   6/2005  Kumar

* cited by examiner

SOLENOID ASSEMBLY

CROSS-REFERENCE TO RELATED APPLICATIONS

This application is a continuation of U.S. application Ser. No. 11/739,179, filed Apr. 24, 2007, now pending, which is hereby incorporated by reference as though fully set forth herein.

TECHNICAL FIELD

The present invention relates to magnetic solenoids, including an assembly for a magnetic solenoid configured for use in connection with a solenoid operated valve.

BACKGROUND

Magnetic solenoid valves are subject to tolerance "stack up" associated with the inclusion of multiple components. To improve quality and functionality of solenoid assemblies, including the function of an operating rod, there is commonly a desire to reduce the stack up of associated dimensional tolerances. A reduction in tolerance stack-up can, among other things, improve the alignment associated with operative components of the assembly.

SUMMARY

A solenoid assembly for use in connection with a housing and valve body is disclosed. The assembly includes a magnetic coil, a magnetic pole piece, an operating rod, and a magnetic armature. The operating rod is slidably disposed within a portion of the pole piece and is at least in part centered relative to the pole piece. Activation of the coil provides an attraction between the armature and the pole piece. An embodiment of the assembly may additionally include one or more bearings positioned between the operating rod and the pole piece.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
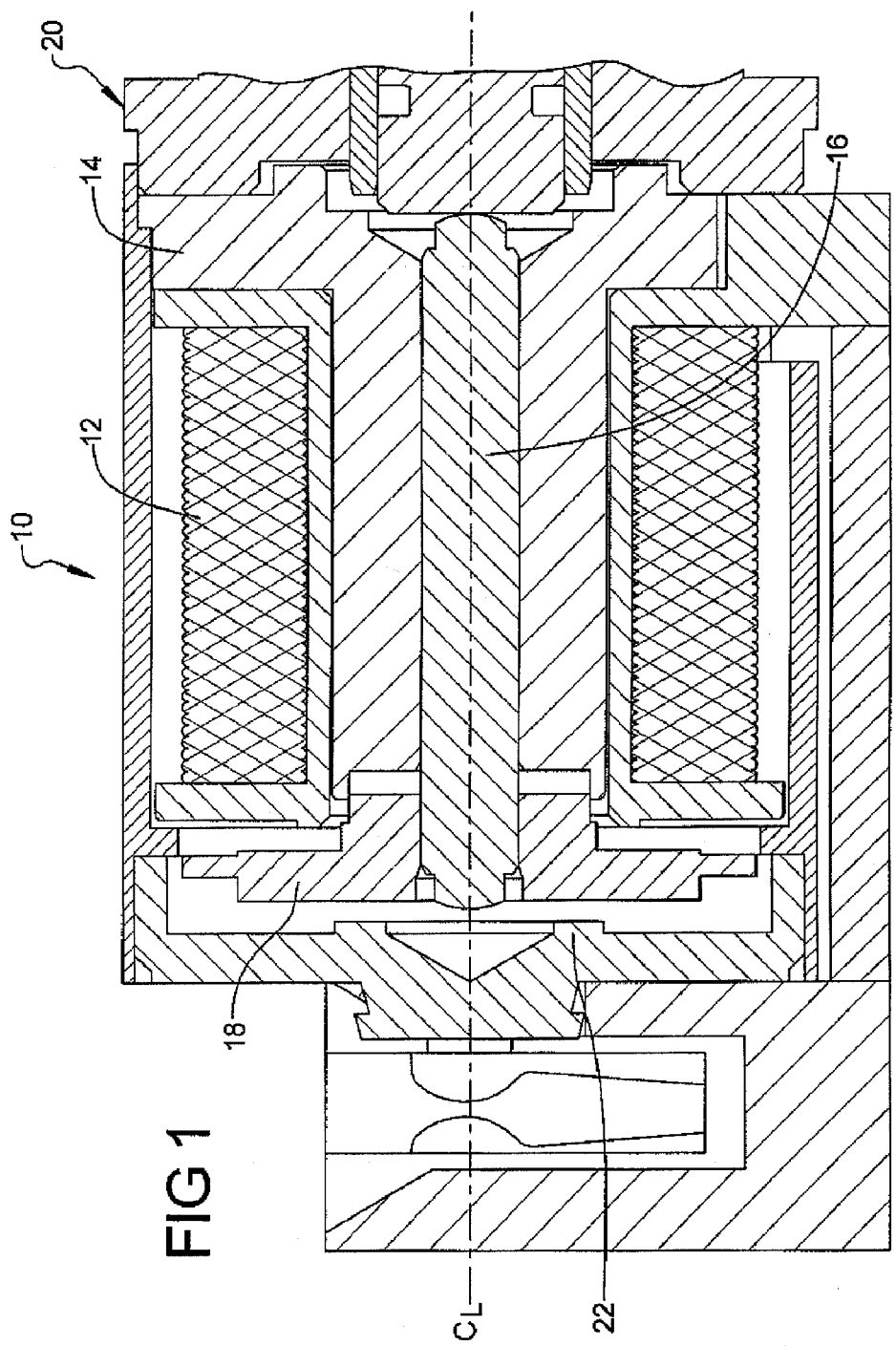
FIG. 1 is a cross-sectional view of an assembly for a magnetic solenoid according to an embodiment of the invention.

An embodiment of a solenoid assembly 10 is shown in FIG. 1. In the illustrated embodiment, the solenoid assembly 10 is shown as part of a larger valve assembly. The illustrated solenoid assembly 10 includes a coil 12, a pole piece 14, an operating rod 16, and an armature 18. A centerline for the assembly is generally designated as CL. A portion of a valve body is generally designated as element 20. However, one of skill in the art will recognize that the invention is not limited to a valve body 20 of the type shown, and other forms and configurations of valve bodies may be employed without departing from the teachings of the invention.

The coil 12, pole piece 14 and armature 18 are each configured to be at least partially magnetic, and those components may be referred to as "magnetic." In an embodiment, the operating rod 16, which is sometimes referred to as a pin or operating pin, is not comprised of a magnetic material and, hence, may be referred to as a "non-magnetic" operating rod. For example, without limitation, the operating rod 16 may be comprised of stainless steel, aluminum, or brass. The illustrated solenoid assembly 10 may also be referred to as a magnetic solenoid or magnetic solenoid assembly.

At least a portion of pole piece 14 is positioned inside of coil 12. In the illustrated embodiment, a majority of the pole piece that extend in the direction parallel to the centerline CL of the assembly is positioned inside of coil 12.

In an embodiment of the invention, a pin or operating rod 16 is positioned within a portion of a cavity or opening (such as a bore) formed by an inner surface of pole piece 14. Rod 16 can be configured to generally extend longitudinally about the centerline CL of the assembly 10. As shown, armature 18 is positioned about an end of operating rod 16 that is more remote from an end configured to communicate with a valve body 20.

In an embodiment, operating rod 16 is slidably disposed within a portion of pole piece 14, and extends beyond coil 12 and pole piece 14. The operating rod 16 can then, as generally illustrated, further extend into a receiving portion of armature 18. The receiving portion of armature 18 may comprise a cavity or aperture formed in a portion of the armature positioned about centerline CL. Armature 18, which can be centered relative to pole piece 14, may also serve to keep the operating rod on a desired (e.g., "on-center" or centerline) path with respect to other components of the assembly 10. In an embodiment of the invention, the activation of coil 12 can provide an attraction between armature 18 and pole piece 14. For example, such an activation can attract the armature 18 to pole piece 14. However, as generally illustrated in FIG. 1, the assembly 10 may be configured such that, in at least one operative state, coil 12 does not surround armature 18.

As generally illustrated, armature 18 can be configured to interact directly with a portion of housing 22. That is, the assembly 10 can be configured such that at least a portion of an associated flux travels from the pole piece 14, into and through the armature 18, and directly on to a portion of an associated housing 22.

For some applications, such a configuration can eliminate the need for the assembly to include a flux collector—which can reduce the number of necessary components associated with the solenoid assembly. A reduction in the number of components can potentially provide advantages, including a potential reduction in the "stack up" of dimensional tolerances associated with various components of the solenoid assembly. For example, because the invention does not require a conventional flux collector, the costs for components may be reduced and the tolerance stack up of the assembly, for example in the direction perpendicular to the centerline CL, can potentially also be reduced.

Moreover, for some applications, the improved "packaging" of the inventive assembly (e.g., potential elimination of flux collector and/or reduction in tolerance stack-up) can permit an armature to be designed to be larger, which can potentially provide for more functional interaction between the armature and other components.

Figure 2:
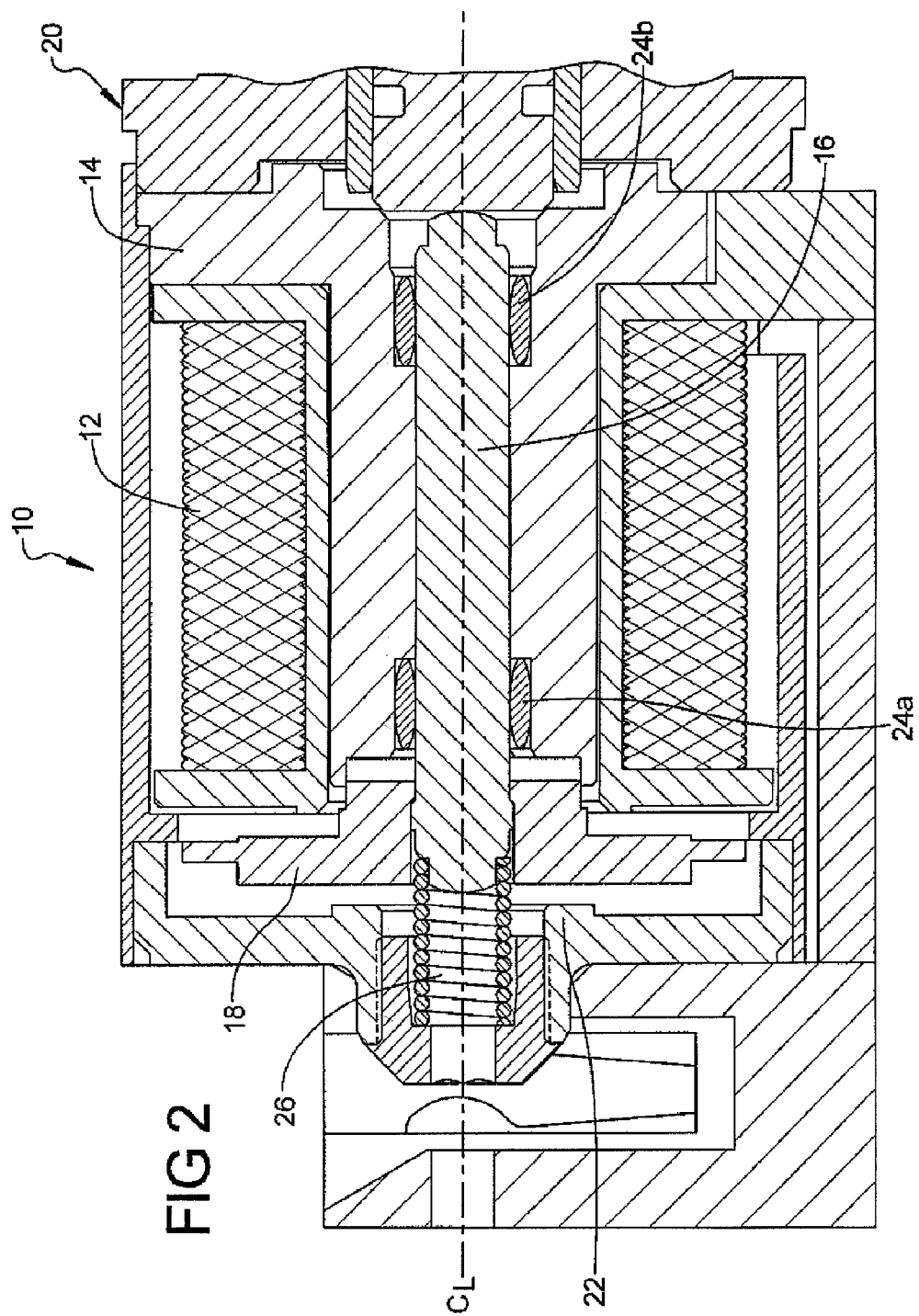
FIG. 2 is a cross-sectional view of an assembly for a magnetic solenoid according to another embodiment of the invention.

Another embodiment of the invention is generally illustrated in FIG. 2, where similar components discussed in connection with the embodiment shown in FIG. 1 have been designated with similar reference numerals. As discussed in connection with the prior embodiment, the armature 18 may directly interact with a portion of housing 22; however, the assembly 10 shown in FIG. 2 includes a bearing, and for most embodiments, a plurality of bearings, e.g., 24a, 24b. In the illustrated embodiment, the bearings are positioned between a portion of the pole piece 14 and a portion of the operating rod 16. For example, without limitation, portions of the inner surface of pole piece 14 may be designed or configured to retain or "seat" one or more bearings for operative communication with an operating rod 16. Moreover, the bearings may be pressed into the pole piece 14 from opposing ends. Further, as generally illustrated a spring element, e.g., spring 26, may be adapted for operative connection with the operating rod 16. In the embodiment illustrated in FIG. 2, spring 26 is positioned about the end of the operating rod about armature 18.

In an embodiment of the invention, assembly 10 includes at least two bearings. In the illustrated embodiment, one bearing 24a is positioned about a first longitudinal half of the operating rod 16, which in this case is the half adjacent the armature 18. A second bearing 24b is positioned about a second longitudinal half of the operating rod 16, which in the illustrated example is positioned closer to valve body 20. The sizing, position and spacing of the associated plurality of bearings can be configured such that the operational rod 16 slides on the bearings 24a, 24b, which keep the armature 18 substantially centered relative to the pole piece 14. In accordance with an embodiment of the invention, the magnetic pole piece 14 may be configured to receive the bearings 24a, 24b. In this embodiment, the bearings 24a, 24b may be separately installed components. In accordance with another embodiment of the invention, the magnetic pole piece 14 may comprise and/or define the bearings 24a, 24b. In this embodiment, the bearing surfaces are formed as part of the magnetic pole piece 14 itself. Assembly 10 may be configured for allowing the alignment of two bearings 24a, 24b in a magnetic solenoid to depend on a single component (e.g., magnetic pole piece 14), thereby avoiding the tolerance stack up associated with multiple components that would otherwise define and/or receive the bearings.

Figure 3:
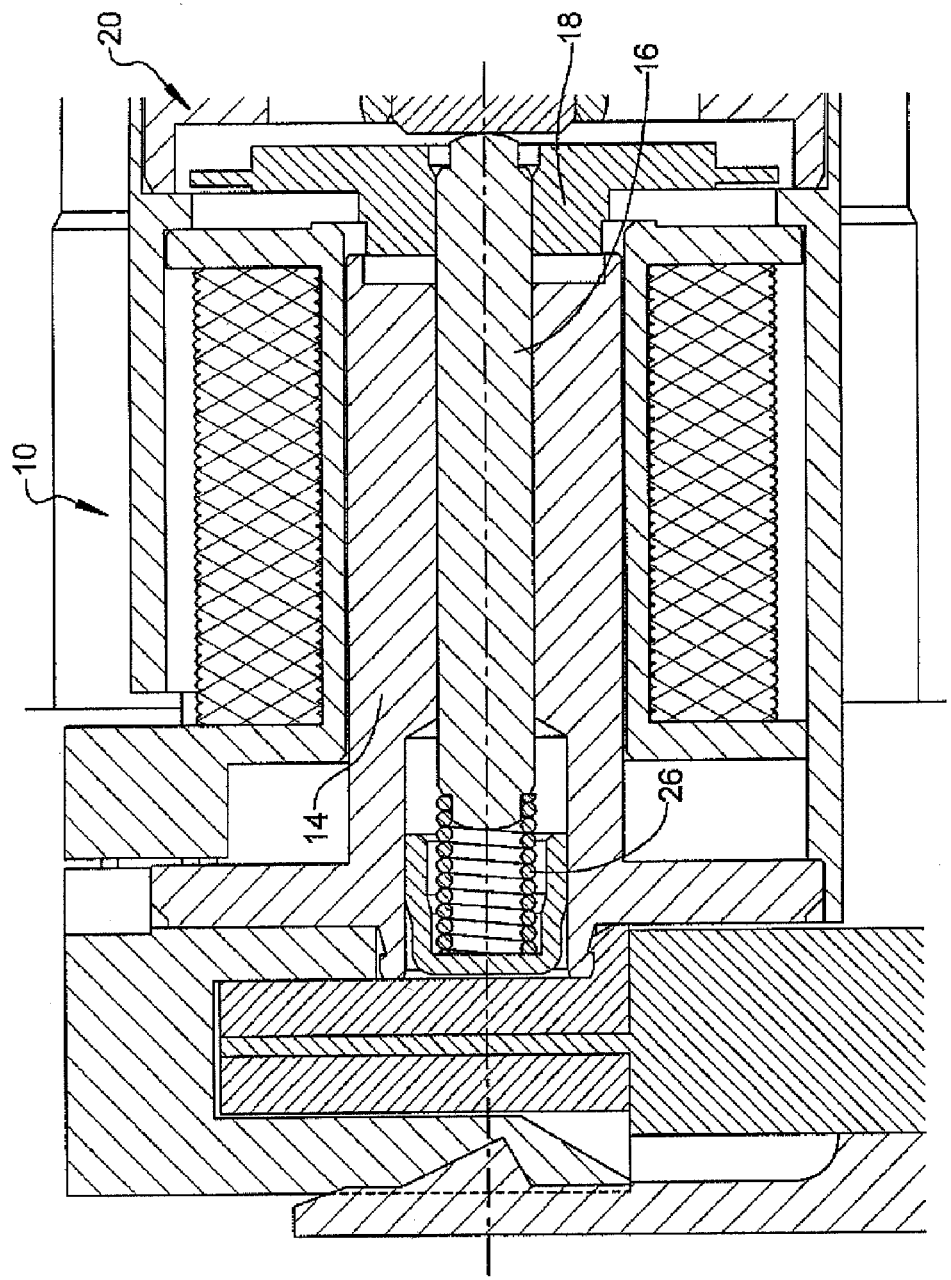
FIG. 3 is a cross-sectional view of an assembly for a magnetic solenoid according to a further embodiment of the invention.

Yet another embodiment of the invention is generally illustrated in FIG. 3, in which similar components discussed in connection with the embodiments shown in FIGS. 1 and 2 have been designated with similar reference numerals. In this embodiment, the valve body 20 is located on the other end of the solenoid assembly 10 when compared to the assemblies shown in FIGS. 1 and 2. For such an alternative configuration, the valve body 20 is located on the same end as armature 18.

The embodiment depicted in FIG. 3 is shown without the inclusion of bearings; however, one skilled in the art will understand that bearings, for example, as generally disclosed in connection with the embodiment shown in FIG. 2, may be optionally included. Further, as generally illustrated a spring element, e.g., spring 26, may be adapted for operative connection with the operating rod 16. In the embodiment illustrated in FIG. 3, spring 26 is positioned about the end of the operating rod remote from armature 18.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A solenoid assembly for use in connection with a housing and valve body, the assembly having a longitudinal axis and comprising:
   a magnetic coil;
   a magnetic pole piece, wherein a majority of the pole piece extends in a direction parallel to the longitudinal axis of the assembly and is positioned inside of the coil;
   an operating rod positioned within a portion of a cavity or aperture formed by the pole piece, wherein the operating rod and pole piece are concentric;
   a magnetic armature positioned about an end of the operating rod, the armature configured to interact directly with said housing;
   a first bearing positioned between a first portion of the magnetic pole piece and a first portion of the operating rod; and
   a second bearing positioned between a second portion of the magnetic pole piece and a second portion of the operating rod, wherein the first and second portions of the magnetic pole piece comprise a single, integral component;
   wherein the operating rod is slidably disposed along the first and second bearings, the armature is at least in part centered relative to the pole piece, and activation of the coil provides an attraction between the armature and the pole piece.

2. The assembly of claim 1, wherein the magnetic armature is positioned about an end of the operating rod that is more remote from said valve body.

3. The assembly of claim 1, wherein the magnetic armature is positioned about an end of the operating rod that is closer to said valve body.

4. The assembly of claim 1, including a spring element positioned about an end of the operating rod nearest the armature.

5. The assembly of claim 1, including a spring element positioned about an end of the operating rod that is more remote from the armature.

6. The assembly of claim 1, wherein the operating rod is comprised of non-magnetic material.

7. The assembly of claim 6, wherein the operating rod is comprised of stainless steel, aluminum, or brass.

8. The assembly of claim 1, wherein the operating rod is retained on-center by the pole piece.

9. The assembly of claim 1, wherein at least a portion of an associated flux travels from the pole piece, into and through the armature, and directly on to said housing.

10. The assembly of claim 1, wherein the activation of the coil attracts the armature to the pole piece.

11. The assembly of claim 1, wherein an associated dimensional tolerance stack-up for the assembly consists solely of the tolerances associated with the coil, pole piece, operating rod, and armature.

12. The assembly of claim 1, wherein the majority of the external surface of the operating rod is in operative contact with an internal surface of the pole piece.

13. The assembly of claim 1, wherein, when the coil is in a non-activated condition, the coil does not surround the armature.

14. The assembly of claim 1, wherein the magnetic armature is positioned externally at the end of the operating rod.

15. The assembly of claim 1, wherein at least a portion of the magnetic pole piece comprises the first and second bearings.

16. The assembly of claim 1, wherein at least a portion of the magnetic pole piece is configured to receive the first and second bearings.

17. A solenoid assembly for use in connection with a housing, the assembly having a longitudinal axis and comprising:
   a magnetic coil;
   a magnetic pole piece, wherein a majority of the pole piece extends in a direction parallel to the longitudinal axis of the assembly and is positioned inside the coil;
   an operating rod comprised of a non-magnetic material that is positioned within a portion of a cavity or aperture formed by the magnetic pole piece, wherein the operating rod and pole piece are concentric;
   a magnetic armature positioned about one end of the operating rod, the armature configured to interact directly with said housing;
   a first bearing positioned between a first portion of the magnetic pole piece and a first portion of the operating rod; and
   a second bearing positioned between a second portion of the magnetic pole piece and a second portion of the operating rod, wherein the first and second portions of the magnetic pole piece comprise a single, integral component;
   wherein the operating rod is slidably disposed on the first and second bearings; the armature is at least in part centered relative to the pole piece; activation of the coil provides an attraction between the armature and the pole piece; the operating rod is retained on-center by the at least two bearings; and the activation of the coil attracts the armature to the pole piece.

18. The assembly of claim 17, wherein, when the coil is in a non-activated condition, the coil does not surround the armature.

19. The assembly of claim 1, wherein the magnetic armature is positioned externally at the end of the operating rod.

20. A solenoid assembly for use in connection with a housing and valve body, the assembly having a longitudinal axis and comprising:
   a magnetic coil;
   a magnetic pole piece, wherein a majority of the pole piece extends in a direction parallel to the longitudinal axis of the assembly and is positioned inside of the coil;
   an operating rod positioned within at least a portion of a cavity or aperture formed by the pole piece, wherein the operating rod and pole piece are concentric;
   a magnetic armature positioned externally at an end of the operating rod;
   a first bearing positioned between a first portion of the magnetic pole piece and a first portion of the operating rod; and
   a second bearing positioned between a second portion of the magnetic pole piece and a second portion of the operating rod, wherein the first and second portions of the magnetic pole piece comprise a single, integral component;
   wherein the operating rod is slidably disposed along the first and second bearings and wherein at least a portion of the magnetic pole piece comprises the bearings or is configured to receive the bearings.

* * * * *